US012609991B2

(12) United States Patent (10) Patent No.: US 12,609,991 B2
Spitulski et al. (45) Date of Patent: Apr. 21, 2026

(54) ROUTING GENERIC HTTP TRAFFIC OVER A REVERSED UDP STREAM

(71) Applicant: NVIDIA Corporation, Santa Clara, CA (US)

(72) Inventors: Frank James Spitulski, Gilroy, CA (US); Bojan Vukojevic, Pleasanton, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 34 days.

(21) Appl. No.: 18/673,105

(22) Filed: May 23, 2024

(65) Prior Publication Data

US 2025/0365237 A1 Nov. 27, 2025

(51) Int. Cl.
*H04L 67/2895* (2022.01)
*H04L 9/40* (2022.01)
*H04L 47/19* (2022.01)
*H04L 67/141* (2022.01)
*H04L 69/165* (2022.01)

(52) U.S. Cl.
CPC ...... *H04L 67/2895* (2013.01); *H04L 63/0281* (2013.01); *H04L 67/141* (2013.01); *H04L 69/165* (2013.01); *H04L 47/196* (2013.01)

(58) Field of Classification Search
CPC ........... H04L 67/01–75; H04L 63/0281; H04L 67/14–142; H04L 67/2895; H04L 69/165; H04L 69/169
See application file for complete search history.

(56) References Cited

U.S. PATENT DOCUMENTS

| | | | | |
|---|---|---|---|---|
| 6,104,716 A | * | 8/2000 | Crichton | ............. H04L 63/0281 |
| | | | | 726/11 |
| 9,648,043 B2 | * | 5/2017 | Handa | ................. H04L 63/0209 |
| 10,397,185 B1 | * | 8/2019 | Sandholm | ............. H04L 63/102 |
| 11,778,039 B1 | * | 10/2023 | Delaney | ................ H04L 67/141 |
| | | | | 709/228 |
| 2002/0038371 A1 | * | 3/2002 | Spacey | ............... H04L 63/0272 |
| | | | | 709/227 |
| 2002/0156897 A1 | * | 10/2002 | Chintalapati | ......... H04L 69/162 |
| | | | | 709/227 |
| 2003/0056030 A1 | * | 3/2003 | Gao | ......................... H04L 67/02 |
| | | | | 719/330 |
| 2003/0188001 A1 | * | 10/2003 | Eisenberg | ............. H04L 69/166 |
| | | | | 709/229 |
| 2004/0088731 A1 | * | 5/2004 | Putterman | ............. H04L 65/612 |
| | | | | 725/117 |

(Continued)

OTHER PUBLICATIONS

"Cloud computing." Wikipedia, May 22, 2023. Internet Archive, https://web.archive.org/web/20230522132224/https://en.wikipedia.org/wiki/Cloud_computng.*

*Primary Examiner* — Brendan Y Higa
(74) *Attorney, Agent, or Firm* — Squire Patton Boggs LLP; Sarah Mirza

(57) ABSTRACT

In various examples, a technique for routing generic HTTP traffic over a reversed UDP stream includes receiving, from a client device via a first connection, a client request to perform a function with a server that is not addressable by the client device; determining that a second connection with the server has been established; receiving first data from and transmitting second data to the client device via the first connection; and transmitting the first data to and receiving the second data from the server via the second connection.

20 Claims, 8 Drawing Sheets

(56)          References Cited

U.S. PATENT DOCUMENTS

| 2005/0080930 A1* | 4/2005 | Joseph | ................... | G06F 9/547 |
| | | | | 709/248 |
| 2015/0150113 A1* | 5/2015 | Robb | ..................... | H04L 67/56 |
| | | | | 726/12 |
| 2017/0063972 A1* | 3/2017 | Goodwyn | ............. | H04L 41/083 |
| 2021/0329100 A1* | 10/2021 | Knight | ................... | H04L 67/51 |
| 2024/0129378 A1* | 4/2024 | Mestery | ................. | H04L 67/56 |

* cited by examiner

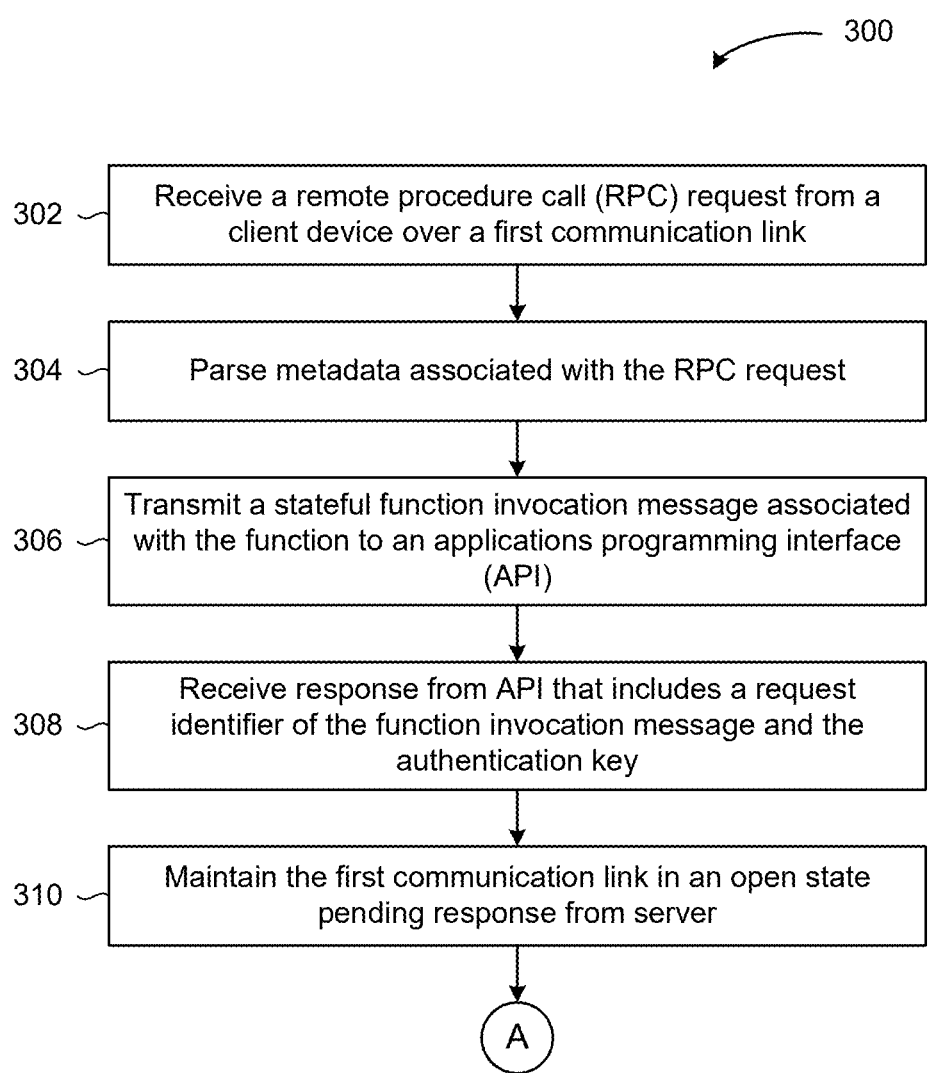

302 — Receive a remote procedure call (RPC) request from a client device over a first communication link 304 — Parse metadata associated with the RPC request 306 — Transmit a stateful function invocation message associated with the function to an applications programming interface (API)

308 — Receive response from API that includes a request identifier of the function invocation message and the authentication key 310 — Maintain the first communication link in an open state pending response from server

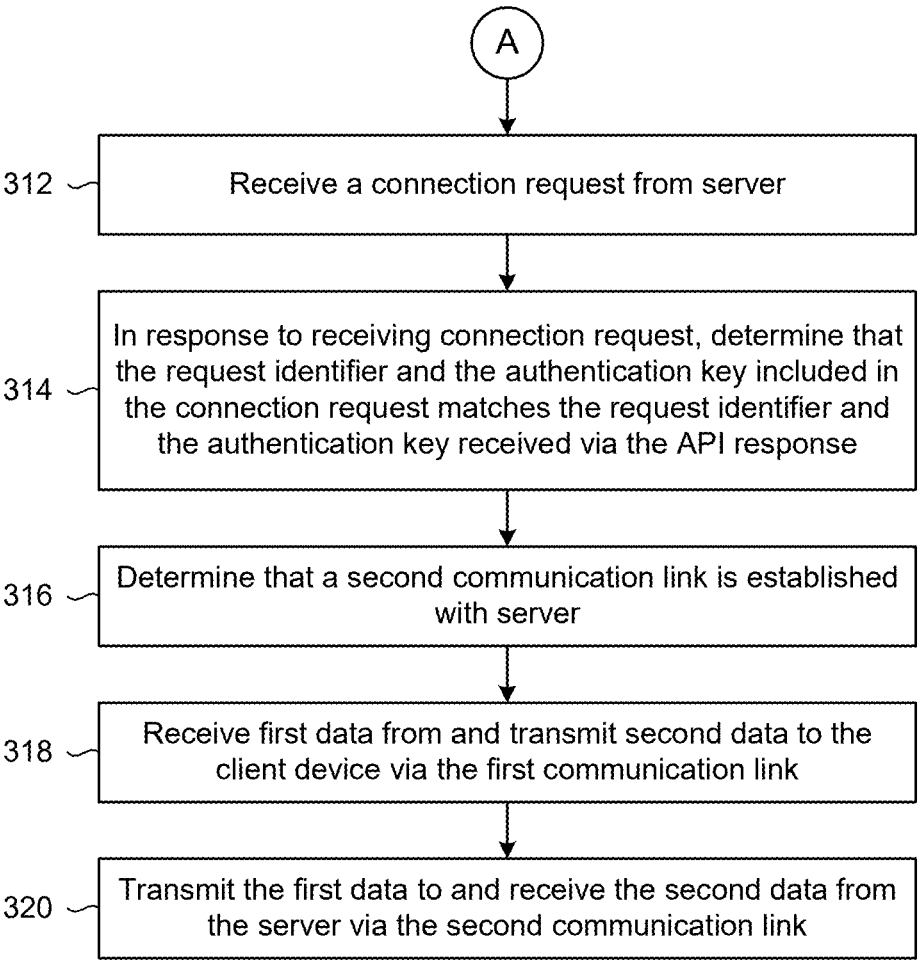

312 — Receive a connection request from server

314 — In response to receiving connection request, determine that the request identifier and the authentication key included in the connection request matches the request identifier and the authentication key received via the API response 316 — Determine that a second communication link is established with server 318 — Receive first data from and transmit second data to the client device via the first communication link 320 — Transmit the first data to and receive the second data from the server via the second communication link

ROUTING GENERIC HTTP TRAFFIC OVER A REVERSED UDP STREAM

BACKGROUND

Field of the Various Embodiments

Various embodiments relate generally to computing system architectures and, more specifically, to routing generic HTTP traffic over a reversed UDP stream.

Description of the Related Art

In networked computer systems, one or more client devices communicate with one or more servers to perform functions during the execution of certain software applications, such as machine learning inferencing applications. With inference applications, a machine learning model is trained on an input training dataset that exhibits certain patterns and relationships. Once the model is trained, the model can be applied to new input data to make predictions regarding patterns and relationships present in the new input data. Servers can be deployed in a set of graphics processing unit (GPU) clusters that are optimized for performing operations, such as machine learning operations, in a highly parallel manner. Such servers are referred to as GPU servers.

In operation, clients connect to and communicate with GPU servers via a remote procedure call (RPC) framework over a transport control protocol/internet protocol (TCP/IP) connection. One such RPC framework is an open-source framework known as general-purpose remote procedure call (gRPC). In a gRPC implementation, a client stores data and function calls in a protocol buffer (protobuf) and transmits a reference to the protobuf to the GPU server. The GPU server can then execute the functions specified by the function calls included in the protobuf on the data referenced by the protobuf.

One potential drawback with this approach is that, because the client transmits a reference to the protobuf to the GPU server, the GPU server needs to be publicly addressable, or routable, by the client. However, for security reasons, at least some GPU servers are secure and are not publicly addressable by clients. Instead, to establish a connection between a client and a secure GPU server, the secure GPU server initiates contact with the client rather than the other way around. However, to operate effectively, this approach requires changes to the communications protocol between client and GPU server, potentially leading to changes in the client applications and the specifications for the protobuf data and function calls. Such changes are impractical and often impossible to make. While the need for such changes could be avoided by making the GPU servers publicly addressable, modifying access to the GPU servers increases the risk of security breaches of the GPU servers.

As such, a need exists for more effective techniques for improving communications between client devices and servers to perform various functions.

SUMMARY

Embodiments of the present disclosure relate to routing generic HTTP traffic over a reversed UDP stream. The techniques described herein include a method, comprising: receiving, from a client device via a first connection, a client request to perform a function with a server that is not addressable by the client device; determining that a second connection with the server has been established; receiving first data from and transmitting second data to the client device via the first connection; and transmitting the first data to and receiving the second data from the server via the second connection.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that these techniques result in a high-speed connection between clients and servers in a networked computer system without requiring servers to be publicly accessible, thereby, exposing servers to security risks. Another technical advantage of the disclosed techniques is that client applications and associated protocol buffers do not need to be modified to take advantage of the disclosed techniques, thereby easing implementation of the disclosed techniques.

BRIEF DESCRIPTION OF THE DRAWINGS

So that the manner in which the herein recited features of the various embodiments may be understood in detail, a more particular description of the inventive concepts, briefly summarized herein, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

The present systems and methods for routing generic HTTP traffic over a reversed UDP stream are described in detail below with reference to the attached drawing figures, wherein:

FIGS. 3A-3B illustrate a flow diagram of a method for routing generic HTTP traffic over a reversed UDP stream, according to various embodiments of the present disclosure;

DETAILED DESCRIPTION

Figure 1:
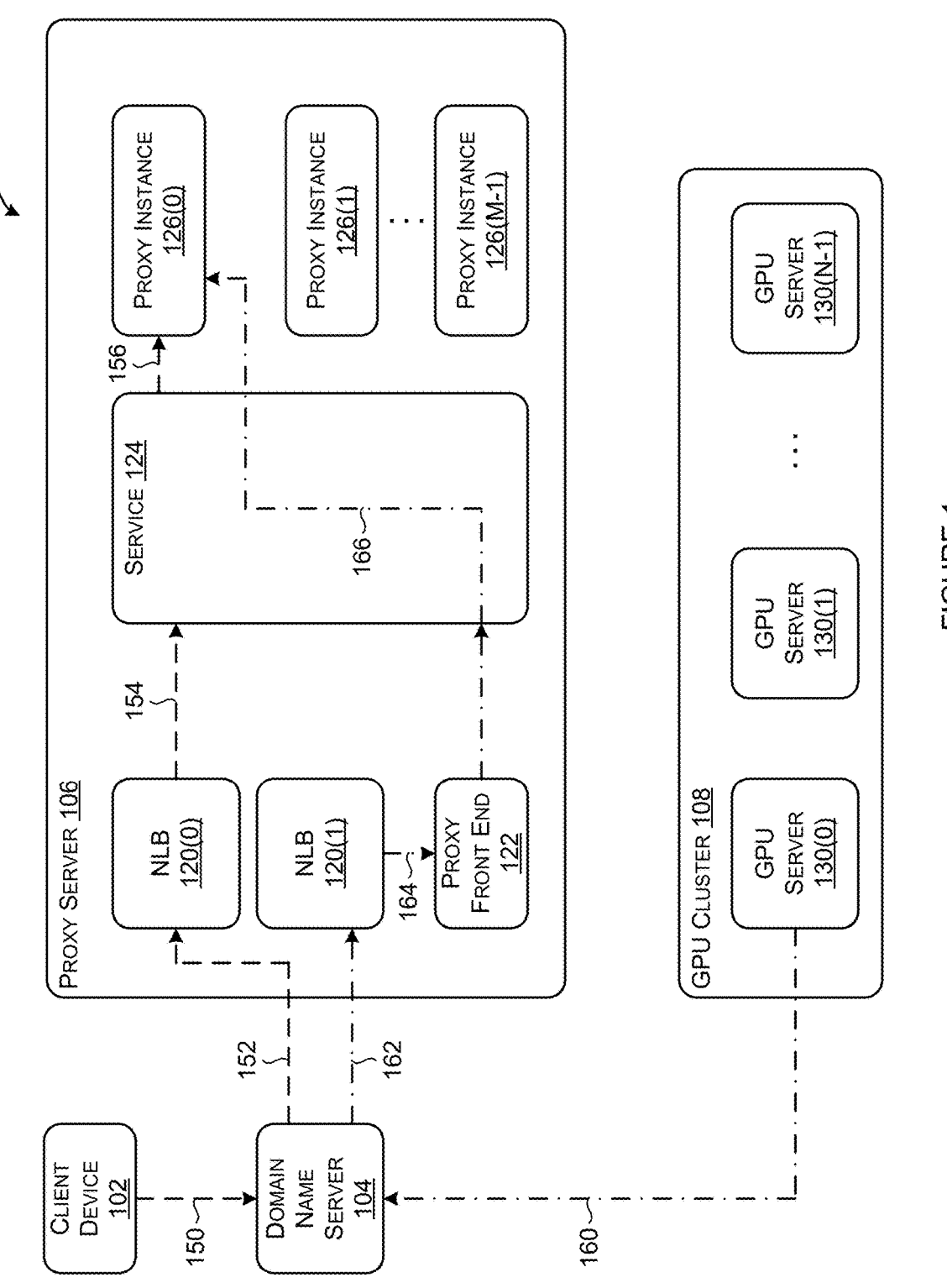
FIG. 1 illustrates a computing system configured to implement one or more aspects of various embodiments, in accordance with some embodiments of the present disclosure.

Systems and methods disclosed herein relate to routing generic HTTP traffic over a reversed UDP stream. In the following description, numerous specific details are set forth to provide a more thorough understanding of the various embodiments. However, it will be apparent to one skilled in the art that the inventive concepts may be practiced without one or more of these specific details.

As discussed herein, when a client connects to and communicate with GPU servers via a typical remote procedure call (RPC) framework, a client stores data and function calls and transmits a reference to the GPU server that indicates the storage location for the data and function calls. The GPU server can then execute the functions specified by the function calls using the referenced data. One potential drawback with this approach is that, because the client transmits a reference to the GPU server, the GPU server needs to be publicly addressable by the client. However, for security reasons, at least some GPU servers are behind security boundaries and are not publicly addressable by clients. Instead, to establish a connection between a client and a secure GPU server, the secure GPU server initiates contact with the client rather than the other way around. However, this approach changes the communications pro- tocol between client and GPU server, potentially requiring changes to client applications in order to work properly. In order to avoid such changes, the GPU servers could be configured to be publicly addressable, with the disadvantage of potentially exposing the GPU servers to a security breach.

By contrast, with the techniques disclosed herein, a proxy server, also referred to herein as a reverse proxy server, has a publicly addressable IP address and, therefore, is publicly addressable by clients. On the other hand, remote GPU servers, also referred to herein as servers or workers, reside in a networked computer system, such as a data center, where each GPU server does not have a publicly addressable IP address. As a result, client devices are not able to directly transmit client requests to the GPU servers, but rather client-server connections originate from the GPU servers out to the client. Client devices establish a stateful connection with the proxy server as if the proxy server is the GPU server. A connection is stateful if a current request can have knowledge of, and access to, data from prior requests, as opposed to a stateless connection where each request does not have knowledge of, or access to, data from prior requests. The stateful connection between the client device and the proxy server can be a transport control protocol/ internet protocol (TCP/IP) connection that is routing gRPC traffic between the client device and the proxy server. Additionally or alternatively, this connection can be a TCP/ IP connection that supports hypertext transfer protocol (HTTP) traffic. The client device transmits client requests to a proxy server via this stateful connection.

When the proxy server receives a client request from a client device, the proxy server authenticates the client request and establishes a stateful connection between the client device and a proxy instance included in the proxy server. The proxy server, via an application programming interface (API), pushes a corresponding stateful work request to a message queue. The stateful work request is a request to initiate a stateful connection to a GPU server to perform one or more functions specified by the client request. The stateful work request includes data that informs the GPU server how to establish a stateful connection between the GPU server and the same proxy instance within the proxy server that is assigned to manage to the client request.

A sidecar application, also referred to herein as a connec- tion agent, associated with the GPU server establishes a reversed uniform data protocol (UDP) connection, such as a reversed QUIC stream, with the proxy server in a manner that is transparent to the GPU server and the client device.

The reversed UDP connection can be a zero round trip time resumption (0-RTT) connection. A 0-RTT connection reduces the time to establish a connection between the GPU server and the reverse proxy server, thereby allowing data to be exchanged between the GPU server and the reverse proxy server with little to no authentication and/or other handshak- ing operations. Once the sidecar application on the GPU server establishes the connection with the reverse proxy server, the reverse proxy server utilizes the connection in a manner that is semantically reversed from the traditional request/response communication model.

When the GPU server processes the stateful work request, the GPU server establishes a stateful connection between the GPU server and the proxy instance. The stateful connection between the GPU server and the proxy server can be a reversed UDP stream that is routing gRPC traffic between the GPU server and the proxy server. Then, the client device can transmit data to, and receive data from, the GPU server through the proxy instance via a bidirectional communica- tion channel as if the GPU server was publicly addressable by the client. In general, gRPC is compatible with TCP/IP but not UDP. However, because the stateful work request includes information that allows the GPU server to route to the same proxy instance assigned to the client request, the GPU server and the proxy server can communicate with each other over a reversed UDP stream. In general, such a reversed UDP stream can achieve higher performance than a traditional TCP/IP connection. The incoming UDP stream is "reversed" in that the data flowing across the stream behaves as if the client initiated the connection rather than the GPU server.

Separately, the GPU server maintains a separate connec- tion to the server application that performs the client func- tion specified by the client device. This separate connection to the server application can also be a TCP/IP connection that is routing gRPC traffic between the client device and the proxy server. As a result, the client device and the server application can exchange gRPC via TCP/IP connections, similar to conventional techniques prior to the present disclosure. However, the proxy instance and the GPU server communicate via a reversed UDP stream without exposing the server IP addresses to the client devices and without requiring changes to the client application executing on the client device or the server application executing on the GPU server.

FIG. 1 illustrates a computing system 100 configured to implement one or more aspects of various embodiments, in accordance with some embodiments of the present disclo- sure. It should be understood that this and other arrange- ments described herein are set forth only as examples. Other arrangements and elements (e.g., machines, interfaces, func- tions, orders, groupings of functions, etc.) may be used in addition to or instead of those shown, and some elements may be omitted altogether. Further, many of the elements described herein are functional entities that may be imple- mented as discrete or distributed components or in conjunc- tion with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example computing device 400 of FIGS. 4-6, and/or example data center 700 of FIG. 7.

As shown, the computing system 100 includes, without limitation, a client device 102, a domain name server 104, a proxy server 106, and a GPU cluster 108. The proxy server 106 is also referred to herein as a reverse proxy server. The proxy server 106 includes, without limitation, two network load balancers (NLBs) 120(0)-120(1), one proxy front end 122, one service 124, and M proxy instances 126(0), 126(1), . . . , 126(M–1). The GPU cluster 108 includes, without limitation, N GPU servers 130(0), 130(1), . . . , 130(N–1). Any one or more of the client devices 102, the domain name server 104, the proxy server 106, and the GPU servers 130 included in the GPU cluster 108 can be implemented via the computing device 400 of FIGS. 4-6, described herein. More specifically, portions of the GPU servers 130 can be implemented by one or more GPUs of FIGS. 4-6, described herein.

To perform functions on a remote GPU server 130, the client device 102 transfers data via a bi-directional connection with the GPU server 130. Because the GPU servers 130 are not publicly accessible or routable from the client device 102, the client device enlists the assistance of the proxy server 106 to establish such a bi-directional connection with the GPU server 130.

In operation, the client device 102 establishes a connection 150 over TCP/IP within a particular domain that is serviced by a domain name server (DNS) 104. The DNS 104 transmits messages received to multiple network load balancers (NLBs), such as NLBs 120(0) and 120(1), included within the proxy server 106. As shown, the client device 102 transmits a domain name associated with a client request over connection 150 to the DNS 104. The DNS 104, in turn, resolves the domain name to an IP address and returns the IP address to the client device 102. The client device 102 uses the IP address to connect to NLB 120(0). The client device 102 transmits the client request over gRPC connection 152 to NLB 120(0).

The NLB 120(0) selects a proxy instance, such as proxy instance 126(0), to service the client request. The NLB 120(0) transmits the client request to the proxy instance 126(0) via a service 124. More specifically, the NLB 120(0) transmits the client request via a gRPC connection 154 over TCP/IP to the service 124. The service 124, in turn, transmits the client request via a gRPC connection 156 over TCP/IP to the proxy instance 126(0). In some embodiments, the service 124 can be a Kubernetes compatible service. In such embodiments, Kubernetes is an open-source system for automating software deployment by assembling one or more computer systems, either virtual machines or bare metal, into a cluster that can execute various functions and/or other workloads in a networked computer system or data center, such as described herein in conjunction with FIG. 7.

The proxy server 106 transmits a stateful function invocation message associated with the function to an API (not shown in FIG. 1), where the API is configured to process the client request. The API generates a stateful work request based on the stateful function invocation message and pushes the stateful work request to a message queue. The stateful work request for a given client request includes the URL of the proxy instance 126 assigned to the client request. In general, the computing system 100 can support multiple APIs, where each API is configured to process certain types of client requests. In some embodiments, each API is associated with a different message queue (not shown in FIG. 1), that queues stateful work requests. Likewise, each GPU server 130 can execute functions for certain types of client requests, corresponding to certain APIs. As a result, each GPU server 130 polls the message queues for those APIs that the GPU server 130 can support.

When a GPU server, such as GPU server 130(0) determines that a message queue has a stateful work request, the GPU server 130(0) retrieves the URL of the proxy instance 126(0) assigned to the corresponding client request. The GPU server 130(0) transmits a connect request via a gRPC connection 160 over TCP/IP to the DNS 104. The DNS 104, in turn, transmits the connect request over connection 162 to NLB 120(1). The NLB 120(1) transmits the connect request via connection 164 to the proxy front end 122. The proxy front end 122 can be any type of proxy service, such as Envoy.

Using the URL included in the connect request, the proxy front end 122 routes the connect request via connection 166 to the same proxy instance 126(0) assigned to the client request. The connect request can be an HTTP3 compatible message. The GPU server 130(0) establishes a reversed UDP connection, such as a QUIC stream connection, to route bidirectional gRPC traffic between the proxy server 106 and the GPU server 130(0). However, gRPC communications between the client device 102 and the proxy server 106 are still routed via a TCP/IP connection. Likewise, gRPC communications to and from the server application executing on the GPU server 130(0) are also routed via a TCP/IP connection.

In this manner, the NLBs 120 establish a connection to process a client request received from a client device 102 in a conventional manner. However, with the disclosed techniques, the proxy front end 122 is dynamically configured to route the corresponding connect request from the GPU server 130(0) to the same proxy instance 126(0) assigned to the client request.

In some embodiments, the proxy front end 122 can execute a configurations script that parses an incoming client request to determine the IP address of a GPU server 130(0) that can process the client request. The proxy front end 122 can translate this IP address into an internal address, such as a URL, of a proxy instance 126(0) to assign to the client request.

It will be appreciated that the computing system 100 shown herein is illustrative and that variations and modifications are possible. The proxy server 106 and the GPU servers 130 of the GPU cluster 108 can be deployed on any suitable computing system, such as the computing system 100 of FIG. 1. The proxy server 106 and one or more GPU servers 130 can be deployed on the same computing system or on any number of different computing systems, so long as the proxy server 106 and the GPU servers 130 reside in the same trust domain (e.g., same local network, etc.). Further, the proxy server 106 is publicly addressable by client devices 102, whereas the GPU servers 130 are not publicly addressable by client devices 102.

The disclosed techniques are described in the context of various client devices 102, proxy instances 126, GPU servers 130, and/or the like communicating via specific types of connections and protocols. However, the disclosed techniques are compatible with any technically feasible types of connections and protocols that can facilitate a bidirectional communication stream, including, without limitation, HTTP1, HTTP2, HTTP3, WebSocket, and/or the like.

The computing system 100 is shown as having specific quantities of the various components, such as one client device 102, one domain name server 104, one proxy server 106, and one GPU cluster 108. Further, the proxy server 106 is shown as having two NLBs 120(0)-120(1), one proxy front end 122, one service 124, and M proxy instances 126(0), 126(1), . . . , 126(M−1). The GPU cluster 108 is shown as having N GPU servers 130(0), 130(1), . . . , 130 (N−1). However, the computing system 100 can be configured to include any number of client devices 102, domain name servers 104, proxy servers 106, GPU clusters 108, NLBs 120, proxy front ends 122, services 124, proxy instances 126 and GPU servers 130, in any combination, within the scope of the present disclosure. In some embodiments, the proxy server 106 and/or the GPU cluster 108 reside in a cloud-based network environments, as described herein.

Figure 7:
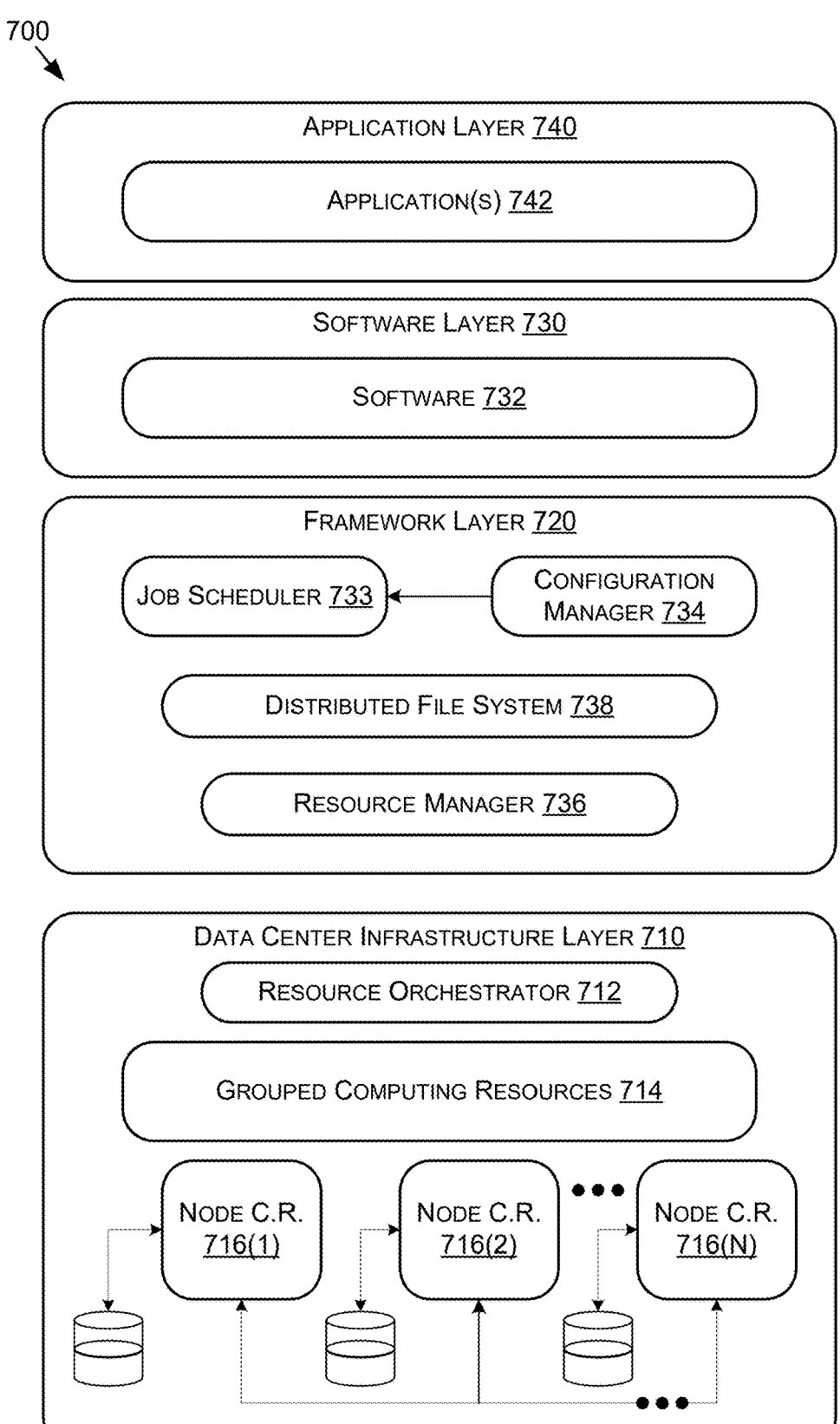
FIG. 7 is a block diagram of an example data center suitable for use in implementing some embodiments of the present disclosure.

The proxy server 106 can reside in a data center, as described herein in conjunction with FIG. 7. For example, and without limitation, the proxy server 106 can reside in, and execute in, an Amazon web services (AWS) platform, a Google cloud platform (GCP), a Microsoft Azure platform, and/or the like.

The GPU cluster 108 can reside in a data center, as described herein in conjunction with FIG. 7. For example, and without limitation, GPU cluster 108 can reside in, and execute in, an Nvidia Geforce Now (GFN) platform, a Microsoft Azure platform, an Oracle cloud-based infrastructure (OCI), and/or the like.

In some examples, the bidirectional communication stream between the client device 102 and the GPU server 130 is a single use stream with no replay capability. As a result, the bidirectional communication stream is resistant to replay attacks, which could otherwise be a vulnerability with 0-RTT UDP communication streams, such as 0-RTT QUIC streams. If the bidirectional communication stream fails while processing a client request, the client device 102 detects the failure and attempts to open a new gRPC connection with the proxy server 106 and try the client request again.

Figure 2:
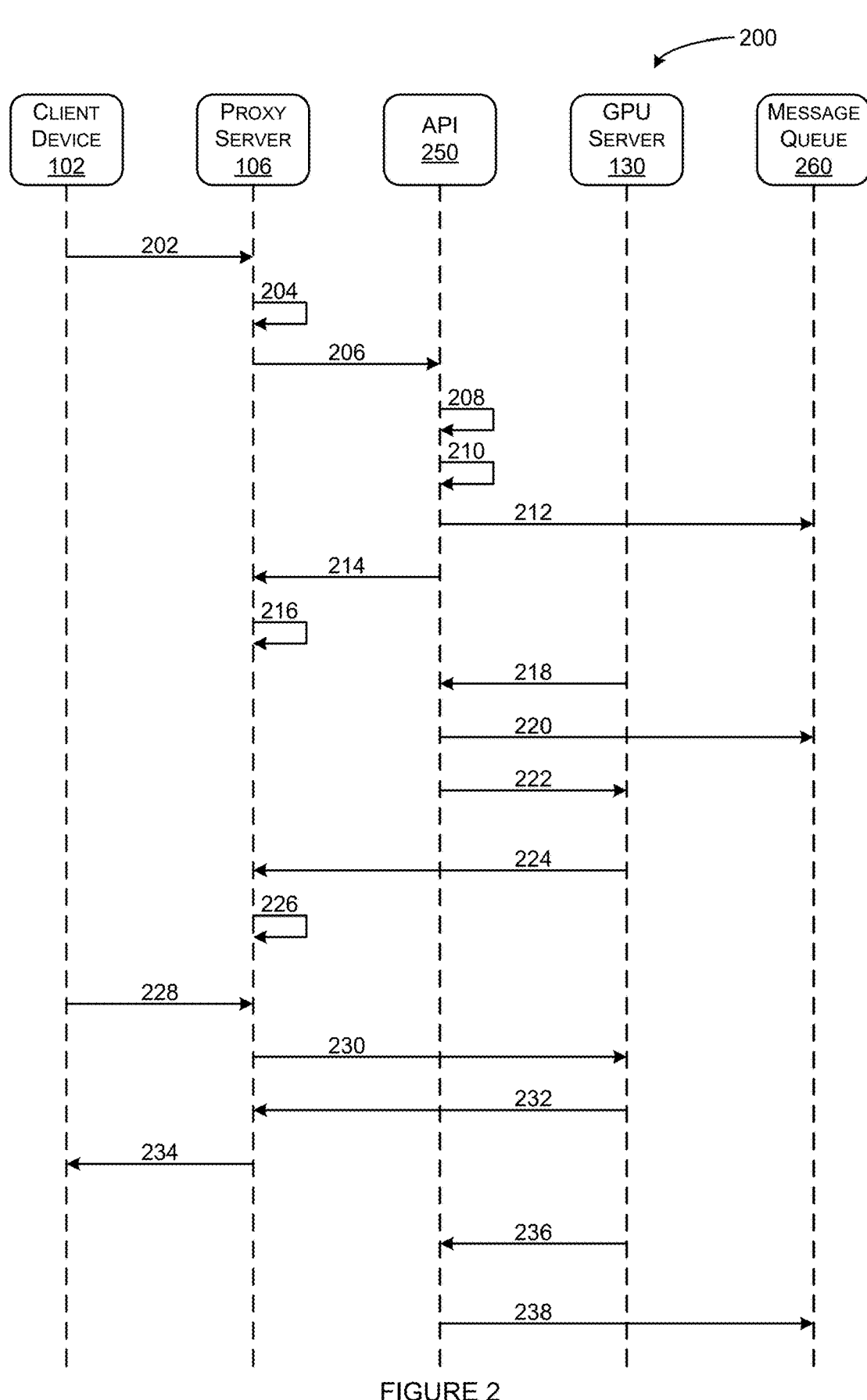
FIG. 2 is a sequence diagram illustrating how a client request is processed by the computing system of FIG. 1, according to various embodiments of the present disclosure.

FIG. 2 is a sequence diagram 200 illustrating how a client request is processed by the computing system 100 of FIG. 1, according to various embodiments of the present disclosure. As shown in FIG. 2, the sequence diagram illustrates interactions among various components of the computing system 100 including, without limitation, a client device 102, a proxy server 106, and a GPU server 130. The proxy server 106 is also referred to herein as a reverse proxy server. Further, the sequence diagram illustrates interactions among these components of the computing system 100 with additional components including, without limitation, an application programming interface (API) 250 and a message queue 260. The API 250 and the message queue 260 can reside within the proxy server 106. Additionally or alternatively, the API 250 and the message queue 260 can reside within any component of the computing system 100 of FIG. 1, in any combination, within the scope of the present disclosure.

As shown in FIG. 2, the sequence diagram 200 begins with step 202, where the client device 102 establishes a TCP/IP connection with the proxy server 106. The client device transmits a client request, such as a gRPC request, to the proxy server 106. The header of the client request can include metadata specifying various parameters, including, without limitation, a function identifier (ID), an optional function version, and authentication data. The function ID specifies one or more functions to be executed by the GPU server 130 on behalf of the client device 102. In cases where the function ID specifies a function that has multiple versions, the function version identifies which version of the function that the GPU server 130 executes. The authentication data allows the proxy server 106 to verify that the client device 102 is authorized to transmit client requests for the particular function specified by the function ID. In addition, the client request specifies input data for the function. The proxy server 106 receives the client request transmitted by the client device 102.

At step 204, the proxy server 106 parses the metadata included in the client request. For example, the proxy server 106 can determine whether the function ID specifies a valid function and whether the function version specifies a valid version of the function specified by the function ID.

At step 206, the proxy server 106 transmits a stateful function invocation message associated with the function to the API 250. The API 250 receives the stateful function invocation message transmitted by the proxy server 106.

At step 208, the API 250 authenticates the function. In so doing, the API 250 can determine that the function ID specified by the stateful function invocation message specifies a valid function and that the client device 102 is authorized to request execution of the specified function.

At step 210, the API 250 generates an authentication key to associate with the client request. The authentication key is generated for use by a server application, also referred to herein as a worker, executing on the GPU server 130. The authentication key is scoped to the specific client request generated by the client device 102 and associated with the function referenced by the stateful function invocation message received from the proxy server 106.

At step 212, the API 250 generates a stateful work request based on the stateful function invocation message. The stateful work request can include metadata specifying various parameters, including, without limitation, a stateful indicator, a request identifier (ID), the authentication key, and a proxy uniform resource locator (URL). The stateful indicator is set to a TRUE logic value, indicating that the work request is stateful. A stateful work request is a request that can have knowledge of, and access to, data from prior work requests, as opposed to a stateless work request which does not have knowledge of, or access to, data from prior work requests. The request ID is a unique identifier that specifies this specific stateful work request. The proxy URL identifies a particular proxy instance executing on the proxy server 106 that processes the corresponding client request. The API 250 pushes the stateful work request associated with the stateful function invocation message onto the message queue 260. The message queue 260 maintains a list of stateful work requests received from various GPU servers 130 included in the GPU cluster 108.

At step 214, subsequent to or in response to pushing the stateful work request onto the message queue 260, the API 250 transmits an API response to the proxy server 106. The API response can include metadata specifying various parameters, including, without limitation, the request ID and the authentication key. The request ID specifies the corresponding stateful work request and, by extension, the stateful function invocation message generated by the proxy server at step 206. The authentication key is the authentication key associated with the client request, generated at step 210. The proxy server 106 receives the API response from the API 250.

At step 216, the proxy server 106 maintains the connection with the client device 102 that generated the client request. The proxy server 106 maintains this connection in an open state and waits for a connect request from the GPU server 130 indicating that a server application executing on the GPU server 130 is available to service the client request associated with the request ID.

Meanwhile, at step 218, the GPU server 130 polls or queries the API 250 to determine whether one or more stateful work requests are pending in the message queue 260. At step 220, the API 250 polls or queries the message queue 260 to determine whether one or more stateful work requests are pending in the message queue 260.

At step 222, when the API 250 determines that a stateful work request is pending in the message queue 260, the API 250 transmits the stateful work request to the GPU server 130 that polled or queried the API 250 for such a stateful work request. The server application executing on the GPU server 130 receives the stateful work request from the API 250.

At step 224, the server application executing on the GPU server 130 transmits a connect request that includes the request identifier of the function invocation message and the authentication key. The connect request registers the server application executing on the GPU server 130 as the server application that is processing the client request. The proxy server 106 receives the connect request from the server application executing on the GPU server 130.

At step 226, subsequent to or in response to receiving the connect request from the GPU server 130, the proxy server 106 verifies that the request identifier and the authentication key included in the connect request match the request identifier and the authentication key received via the API response received from the API 250 at step 214. In so doing, the proxy server 106 determines that a connection has been established with the GPU server 130. In some examples, the connect request can be an HTTP3 request and, once the connect request is successful, the GPU server 130 keeps the body of the request open to serve as a reversed UDP socket for bidirectional communication between the GPU server 130 and the proxy server 106.

More specifically, a connection agent executing on the GPU server 130 establishes the connection with the proxy server 106 in a manner that is transparent to server application executing on the GPU server 130 and the client device 102. The connection agent is also referred to herein as a sidecar application. In this manner, the software application executing on the client device 102 and the server application executing on the GPU server 130 establish connections and transfer data in the same manner as if the client device 102 and the server application executing were directly connected. However, the client device 102 transfers data via a connection with the proxy server 106 via a generic HTTP connection. Likewise, the server application transfers data with the connection agent via a generic HTTP connection. The proxy server 106 and the connection agent transfer data with each other, and on behalf of the client device 102 and the server application, via a reversed UDP connection. As a result, no change is needed to the software application executing on the client device 102 and the server application executing on the GPU server 130 to transfer data between each other over the reversed UDP connection.

At step 228, the software application executing on the client device 102 transmits data to the proxy server 106 via a generic HTTP connection. At step 230, the proxy server 106 transmits the data received from the client device 102 to the connection agent executing on the GPU server 130 via a reversed UDP connection. The connection agent transmits the data received from the proxy server 106 to the server application executing on the GPU server 130 via a generic HTTP connection.

Similarly, at step 232, the server application executing on the GPU server 130 transmits data to the connection agent executing on the GPU server 130 via a generic HTTP connection. The connection agent transmits the data received from the server application to the proxy server 106 via a reversed UDP connection. At step 234, the proxy server 106 transmits the data received from the connection agent to the software application executing on the client device 102 via a generic HTTP connection. In this manner, as shown in steps 228, 230, 232, and 234, the software application executing on the client device 102 and the server application executing on the GPU server 130 can exchange data via respective generic HTTP connections over a reversed UDP stream.

At step 236, when the server application executing on the GPU server 130 completes the one or more functions specified by the client request, the server application transmits an acknowledgement to the API 250. The acknowledgement indicates that execution of the function specified by the stateful work request generated by the API 250 at step 212 is complete. Additionally or alternatively, the proxy server 106 can determine that the server application executing on the GPU server 130 completed the one or more functions specified by the client request by determining that the TCP/IP connection to the GPU server 130 or the client device 102 has closed, by determining that a timeout duration has elapsed without communication from the client device 102, and/or the like. In response, the proxy server 106 closes the reversed UDP connection. The GPU server 130, in turn, determines that the reversed UDP connection has closed. At step 238, the API 250 transmits the acknowledgement to the message queue 260. In some embodiments, the server application executing on the GPU server 130 can directly transmit the acknowledgement to the message queue 260.

Now referring to FIGS. 3A-3B, each block of method 300, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 300 is described, by way of example, with respect to the system of FIGS. 1-2. However, these methods may additionally or alternatively be executed by any one system, or any combination of systems, including, but not limited to, those described herein.

FIGS. 3A-3B illustrate a flow diagram of a method 300 for routing generic HTTP traffic over a reversed UDP stream, according to various embodiments of the present disclosure. As shown in FIGS. 3A-3B, method 300 begins with operation 302, in which the proxy server 106, and/or a proxy instance executing on the proxy server 106, receives a remote procedure call (RPC) request from a client device 102 over a first communication link. The RPC request can be a gRPC request and the first communication link can be a generic HTTP connection. The RPC request is a client request to perform a particular function on a server, such as one of the GPU servers 130 on the GPU cluster 108.

At operation 304, the proxy server 106 parses the metadata associated with the RPC request. For example, the proxy server 106 can determine whether the function ID specifies a valid function and whether the function version specifies a valid version of the function specified by the function ID.

At operation 306, the proxy server 106 transmits a stateful function invocation message associated with the function to an API, such as the API 250 of FIG. 2. The API, in turn, generates a stateful work request based on the stateful function invocation message and pushes the stateful work request to a message queue, such as the message queue 260 of FIG. 2. The stateful work request can include metadata specifying various parameters, including, without limitation, a stateful indicator, a request identifier (ID), the authentication key, and a proxy uniform resource locator (URL).

At operation 308, the proxy server 106 receives a response from the API 250 that includes a request identifier of the function invocation message and an authentication key. Subsequent to or in response to pushing the stateful work request onto the message queue 260, the API 250 transmits an API response to the proxy server 106. The API response can include metadata specifying various parameters, including, without limitation, the request ID and the authentication key. The request ID specifies the corresponding stateful work request and, by extension, the stateful function invocation message previously generated by the proxy server. The proxy server 106 verifies that the authentication key in the response received from the API 250 matches the authentication key associated with the client request.

At operation 310, the proxy server 106 maintains the first communication link in an open state pending response from a server, such as a GPU server 130, that is to perform the function specified by the client request. At operation 312, the proxy server 106 receives a connect request from the GPU server 130 that is to perform the function specified by the client request. The connect request can be an HTTP3 request and, once the connect request is successful, the GPU server 130 keeps the body of the request open to serve as a reversed UDP connection for bidirectional communication between the GPU server 130 and the proxy server 106.

At operation 314, the proxy server 106, in response to receiving the connect request from the GPU server 130, determines that the request identifier and the authentication key included in the connect request matches the request identifier and the authentication key received via the API response from the API 250.

At operation 316, after determining that the request identifier and the authentication key included in the connect request matches the request identifier and the authentication key received via the API response from the API 250, the proxy server 106 determines that a second communication link is established with a connection agent executing on the GPU server 130. The second communication link can be a reversed UDP connection. The connection agent establishes the second communication link with the proxy server 106 on behalf of a server application executing on the GPU server 130. The connection agent, in turn, establishes a connection, such as a generic HTTP connection, with the server application. In essence, the proxy server 106 bridges the first communication link and the second communication link to facilitate transmission of traffic between the client device 102 and the GPU server 130, without exposing the IP address of the GPU server to the client device and without requiring changes to the client application executing on the client device or the server application executing on the GPU server.

At operation 318, the proxy server 106 receives first data from and transmits second data to the client device 102 via the first communication link. The first data is generated by the client application executing on the client device 102 and is directed towards the server application executing on the GPU server 130. The second data is generated by the server application executing on the GPU server 130 and transmitted to the proxy server 106 via a connection agent executing on the GPU server 130. The proxy server 106 transmits this second data to the client device 102 via the first communication link.

At operation 320, the proxy server 106 transmits the first data to and receives the second data from the server via the second communication link. The proxy server 106 transmits the first data generated by the client application to the connection agent via the second communication link. The connection agent, in turn, transmits the first data to the server application. The proxy server 106 receives the second data generated by the server application from the connection agent via the second communication link. The proxy server 106 transmits this second data to the client device 102 via the first communication link.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Computing Device

Figure 4:
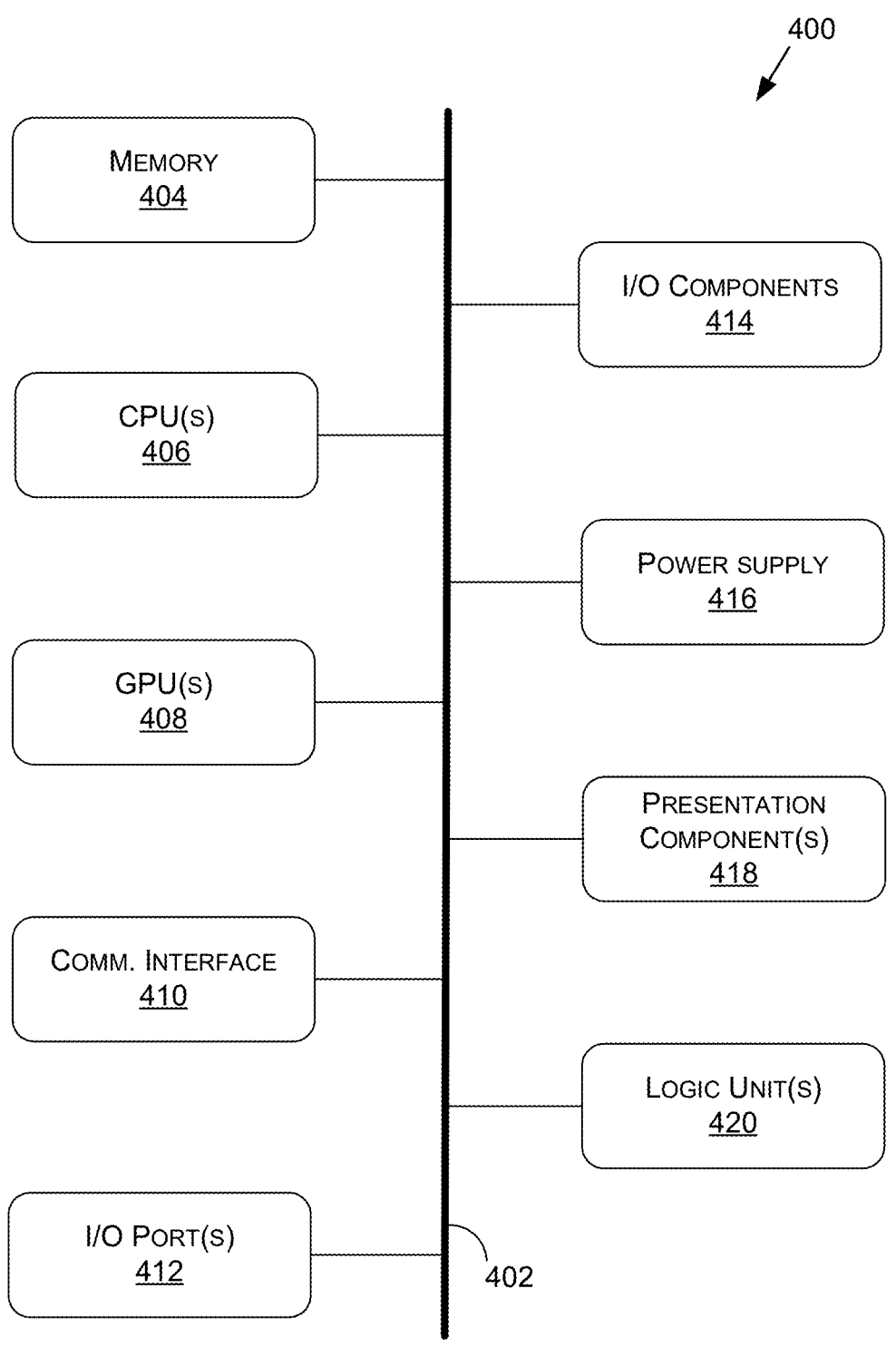
FIG. 4 is a block diagram of an example computing device suitable for use in implementing some embodiments of the present disclosure.

FIG. 4 is a block diagram of an example computing device(s) 400 suitable for use in implementing some embodiments of the present disclosure. Computing device 400 may include an interconnect system 402 that directly or indirectly couples the following devices: memory 404, one or more central processing units (CPUs) 406, one or more graphics processing units (GPUs) 408, a communication interface 410, input/output (I/O) ports 412, input/output components 414, a power supply 416, one or more presentation components 418 (e.g., display(s)), and one or more logic units 420. In at least one embodiment, the computing device(s) 400 may comprise one or more virtual machines (VMs), and/or any of the components thereof may comprise virtual components (e.g., virtual hardware components). For non-limiting examples, one or more of the GPUs 408 may comprise one or more vGPUs, one or more of the CPUs 406 may comprise one or more vCPUs, and/or one or more of the logic units 420 may comprise one or more virtual logic units. As such, a computing device(s) 400 may include discrete components (e.g., a full GPU dedicated to the computing device 400), virtual components (e.g., a portion of a GPU dedicated to the computing device 400), or a combination thereof.

Although the various blocks of FIG. 4 are shown as connected via the interconnect system 402 with lines, this is not intended to be limiting and is for clarity only. For example, in some embodiments, a presentation component 418, such as a display device, may be considered an I/O component 414 (e.g., if the display is a touch screen). As another example, the CPUs 406 and/or GPUs 408 may include memory (e.g., the memory 404 may be representative of a storage device in addition to the memory of the GPUs 408, the CPUs 406, and/or other components). In other words, the computing device of FIG. 4 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 4.

The interconnect system 402 may represent one or more links or busses, such as an address bus, a data bus, a control bus, or a combination thereof. The interconnect system 402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 406 may be directly connected to the memory 404. Further, the CPU 406 may be directly connected to the GPU 408. Where there is direct, or point-to-point connection between components, the interconnect system 402 may include a PCIe link to carry out the connection. In these examples, a PCI bus need not be included in the computing device 400.

The memory 404 may include any of a variety of computer-readable media. The computer-readable media may be any available media that may be accessed by the computing device 400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 406 may be configured to execute at least some of the computer-readable instructions to control one or more components of the computing device 400 to perform one or more of the methods and/or processes described herein. The CPU(s) 406 may each include one or more cores (e.g., one, two, four, eight, twenty-eight, seventy-two, etc.) that are capable of handling a multitude of software threads simultaneously. The CPU(s) 406 may include any type of processor, and may include different types of processors depending on the type of computing device 400 implemented (e.g., processors with fewer cores for mobile devices and processors with more cores for servers). For example, depending on the type of computing device 400, the processor may be an Advanced RISC Machines (ARM) processor implemented using Reduced Instruction Set Computing (RISC) or an x86 processor implemented using Complex Instruction Set Computing (CISC). The computing device 400 may include one or more CPUs 406 in addition to one or more microprocessors or supplementary co-processors, such as math co-processors.

In addition to or alternatively from the CPU(s) 406, the GPU(s) 408 may be configured to execute at least some of the computer-readable instructions to control one or more components of the computing device 400 to perform one or more of the methods and/or processes described herein. One or more of the GPU(s) 408 may be an integrated GPU (e.g., with one or more of the CPU(s) 406 and/or one or more of the GPU(s) 408 may be a discrete GPU. In embodiments, one or more of the GPU(s) 408 may be a coprocessor of one or more of the CPU(s) 406. The GPU(s) 408 may be used by the computing device 400 to render graphics (e.g., 3D graphics) or perform general purpose computations. For example, the GPU(s) 408 may be used for General-Purpose computing on GPUs (GPGPU). The GPU(s) 408 may include hundreds or thousands of cores that are capable of handling hundreds or thousands of software threads simultaneously. The GPU(s) 408 may generate pixel data for output images in response to rendering commands (e.g., rendering commands from the CPU(s) 406 received via a host interface). The GPU(s) 408 may include graphics memory, such as display memory, for storing pixel data or any other suitable data, such as GPGPU data. The display memory may be included as part of the memory 404. The GPU(s) 408 may include two or more GPUs operating in parallel (e.g., via a link). The link may directly connect the GPUs (e.g., using NVLINK) or may connect the GPUs through a switch (e.g., using NVSwitch). When combined together, each GPU 408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 406 and/or the GPU(s) 408, the logic unit(s) 420 may be configured to execute at least some of the computer-readable instructions to control one or more components of the computing device 400 to perform one or more of the methods and/or processes described herein. In embodiments, the CPU(s) 406, the GPU(s) 408, and/or the logic unit(s) 420 may discretely or jointly perform any combination of the methods, processes and/or portions thereof. One or more of the logic units 420 may be part of and/or integrated in one or more of the CPU(s) 406 and/or the GPU(s) 408 and/or one or more of the logic units 420 may be discrete components or otherwise external to the CPU(s) 406 and/or the GPU(s) 408. In embodiments, one or more of the logic units 420 may be a coprocessor of one or more of the CPU(s) 406 and/or one or more of the GPU(s) 408.

Examples of the logic unit(s) 420 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 410 may include one or more receivers, transmitters, and/or transceivers that enable the computing device 400 to communicate with other computing devices via an electronic communication network, included wired and/or wireless communications. The communication interface 410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 420 and/or communication interface 410 may include one or more data processing units (DPUs) to transmit data received over a network and/or through interconnect system 402 directly to (e.g., a memory of) one or more GPU(s) 408.

The I/O ports 412 may enable the computing device 400 to be logically coupled to other devices including the I/O components 414, the presentation component(s) 418, and/or other components, some of which may be built in to (e.g., integrated in) the computing device 400. Illustrative I/O components 414 include a microphone, mouse, keyboard, joystick, game pad, game controller, satellite dish, scanner, printer, wireless device, etc. The I/O components 414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 may be include depth cameras, such as stereoscopic camera systems, infrared camera systems, RGB camera systems, touchscreen technology, and combinations of these, for gesture detection and recognition. Additionally, the computing device 400 may include accelerometers or gyroscopes (e.g., as part of an inertia measurement unit (IMU)) that enable detection of motion. In some examples, the output of the accelerometers or gyroscopes may be used by the computing device 400 to render immersive augmented reality or virtual reality.

The power supply 416 may include a hard-wired power supply, a battery power supply, or a combination thereof. The power supply 416 may provide power to the computing device 400 to enable the components of the computing device 400 to operate.

The presentation component(s) 418 may include a display (e.g., a monitor, a touch screen, a television screen, a heads-up-display (HUD), other display types, or a combination thereof), speakers, and/or other presentation components. The presentation component(s) 418 may receive data from other components (e.g., the GPU(s) 408, the CPU(s) 406, DPUs, etc.), and output the data (e.g., as an image, video, sound, etc.).

Figure 5:
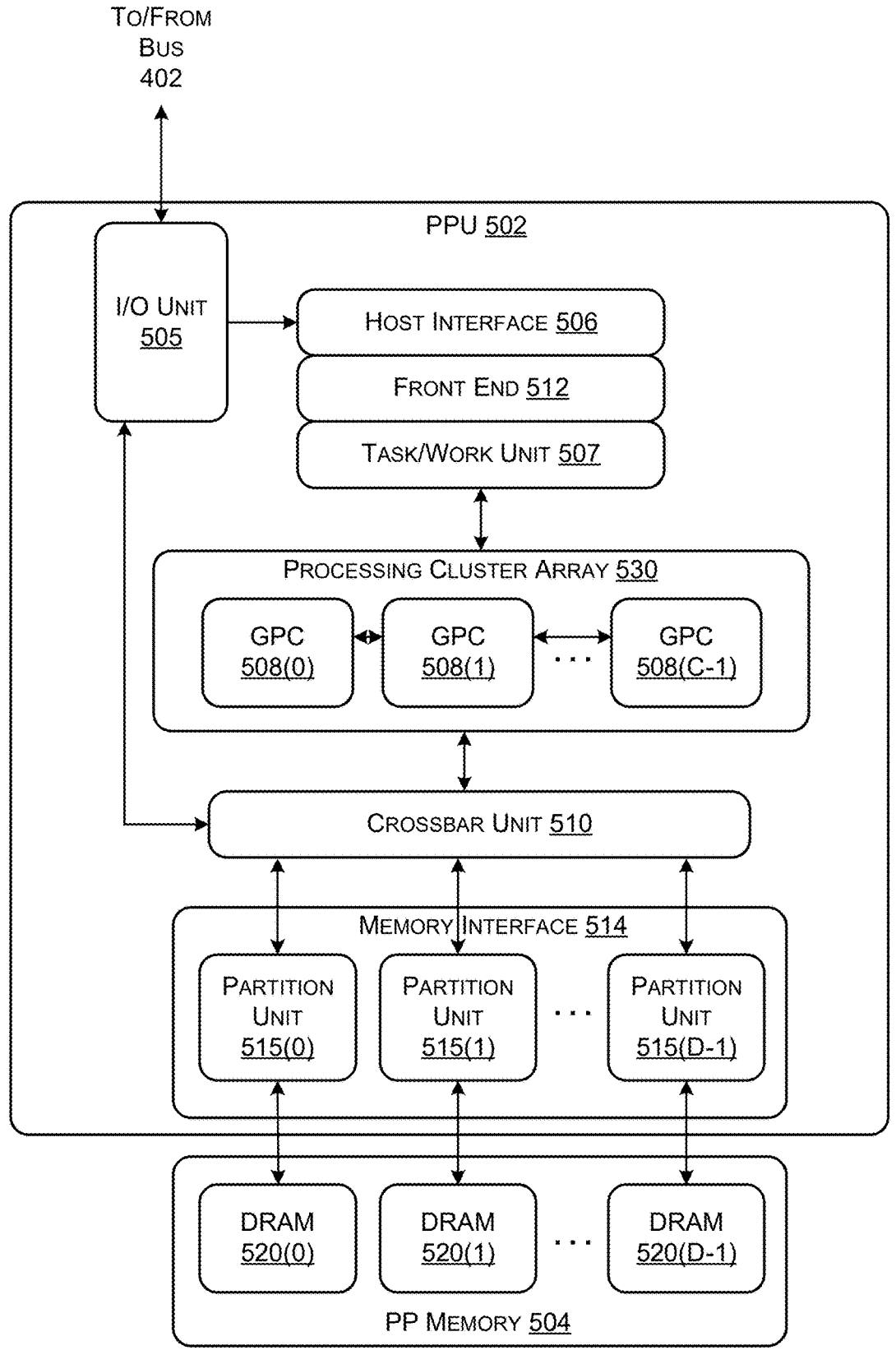
FIG. 5 is a block diagram of a parallel processing unit (PPU) included in the GPUs of FIG. 4, according to various embodiments of the present disclosure.

FIG. 5 is a block diagram of a parallel processing unit (PPU) 502 included in the GPUs 408 of FIG. 4, according to various embodiments. Although FIG. 5 depicts one PPU 502, as indicated above, GPUs 408 can include any number of PPUs 502. As shown, PPU 502 can be coupled to a local parallel processing (PP) memory 504. PPU 502 and PP memory 504 may be implemented using one or more integrated circuit devices, such as programmable processors, application specific integrated circuits (ASICs), or memory devices, or in any other technically feasible fashion.

In some embodiments, PPU 502 comprises a graphics processing unit (GPU) that may be configured to implement a graphics rendering pipeline to perform various operations related to generating pixel data based on graphics data supplied by CPU 406 and/or memory 404. When processing graphics data, PP memory 504 can be used as graphics memory that stores one or more conventional frame buffers and, if needed, one or more other render targets as well. Among other things, PP memory 504 may be used to store and update pixel data and deliver final pixel data or display frames to presentation components 418 for display. In some embodiments, PPU 502 also may be configured for general-purpose processing and compute operations.

In operation, CPU 406 is the master processor of computing device 400, controlling and coordinating operations of other system components. In particular, CPU 406 issues commands that control the operation of PPU 502. In some embodiments, CPU 406 writes a stream of commands for PPU 502 to a data structure (not explicitly shown in either FIG. 4 or FIG. 5) that may be located in memory 404, PP memory 504, or another storage location accessible to both CPU 406 and PPU 502. A pointer to the data structure is written to a pushbuffer to initiate processing of the stream of commands in the data structure. The PPU 502 reads command streams from the pushbuffer and then executes commands asynchronously relative to the operation of CPU 406. In embodiments where multiple pushbuffers are generated, execution priorities may be specified for each pushbuffer by an application program via a device driver (not shown) to control scheduling of the different pushbuffers.

As also shown, PPU 502 includes an I/O (input/output) unit 505 that communicates with the rest of computing device 400 via interconnect system 402. I/O unit 505 generates packets (or other signals) for transmission on interconnect system 402 and also receives all incoming packets (or other signals) from interconnect system 402, directing the incoming packets to appropriate components of PPU 502. For example, commands related to processing tasks may be directed to a host interface 506, while commands related to memory operations (e.g., reading from or writing to PP memory 504) may be directed to a crossbar unit 510. Host interface 506 reads each pushbuffer and transmits the command stream stored in the pushbuffer to a front end 512.

The connection of PPU 502 to the rest of computing device 400 may be varied. In some embodiments, GPU 408, which includes at least one PPU 502, is implemented as an add-in card that can be inserted into an expansion slot of computing device 400. In other embodiments, PPU 502 can be integrated on a single chip with a bus bridge, such as interconnect system 402. Again, in still other embodiments, some or all of the elements of PPU 502 may be included along with CPU 406 in a single integrated circuit or system of chip (SoC).

In operation, front end 512 transmits processing tasks received from host interface 506 to a work distribution unit (not shown) within task/work unit 507. The work distribution unit receives pointers to processing tasks that are encoded as task metadata (TMD) and stored in memory. The pointers to TMDs are included in a command stream that is stored as a pushbuffer and received by the front end 512 from the host interface 506. Processing tasks that may be encoded as TMDs include indices associated with the data to be processed as well as state parameters and commands that define how the data is to be processed. For example, the state parameters and commands could define the program to be executed on the data. The task/work unit 507 receives tasks from the front end 512 and ensures that GPCs 508 are configured to a valid state before the processing task specified by each one of the TMDs is initiated. A priority may be specified for each TMD that is used to schedule the execution of the processing task. Processing tasks also may be received from the processing cluster array 530. Optionally, the TMD may include a parameter that controls whether the TMD is added to the head or the tail of a list of processing tasks (or to a list of pointers to the processing tasks), thereby providing another level of control over execution priority.

PPU 502 advantageously implements a highly parallel processing architecture based on a processing cluster array 530 that includes a set of C general processing clusters (GPCs) 508, where C≥1. Each GPC 508 is capable of executing a large number (e.g., hundreds or thousands) of threads concurrently, where each thread is an instance of an independent sequence of instructions. In various applications, different GPCs 508 may be allocated for processing different types of programs or for performing different types of computations. The allocation of GPCs 508 may vary depending on the workload arising for each type of program or computation.

Memory interface 514 includes a set of D of partition units 515, where D≥1. Each partition unit 515 is coupled to one or more dynamic random access memories (DRAMs) 420 residing within PP memory 504. In one embodiment, the number of partition units 515 equals the number of DRAMs 520, and each partition unit 515 is coupled to a different DRAM 520. In other embodiments, the number of partition units 515 may be different than the number of DRAMs 520. Persons of ordinary skill in the art will appreciate that a DRAM 520 may be replaced with any other technically suitable storage device. In operation, various render targets, such as texture maps and frame buffers, may be stored across DRAMs 520, allowing partition units 515 to write portions of each render target in parallel to efficiently use the available bandwidth of PP memory 504.

A given GPC 508 may process data to be written to any of the DRAMs 520 within PP memory 504. Crossbar unit 510 is configured to route the output of each GPC 508 to the input of any partition unit 515 or to any other GPC 508 for further processing. GPCs 508 communicate with memory interface 514 via crossbar unit 510 to read from or write to various DRAMs 520. In one embodiment, crossbar unit 510 has a connection to I/O unit 505, in addition to a connection to PP memory 504 via memory interface 514, thereby enabling the processing cores within the different GPCs 508 to communicate with memory 404 or other memory not local to PPU 502. In the embodiment of FIG. 5, crossbar unit 510 is directly connected with I/O unit 505. In various embodiments, crossbar unit 510 may use virtual channels to separate traffic streams between the GPCs 508 and partition units 515.

Again, GPCs 508 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 502 is configured to transfer data from memory 404 and/or PP memory 504 to one or more on-chip memory units, process the data, and write result data back to memory 404 and/or PP memory 504. The result data may then be accessed by other system components, including CPU 406, another PPU 502 within GPU 408, or another GPU 408 within computing device 400. Data transfers between two or more PPUs 502 over high-speed links are referred to herein as peer transfers and such PPUs 502 are referred to herein as peers.

As noted above, any number of PPUs 502 may be included in a GPU 408. For example, multiple PPUs 502 may be provided on a single add-in card, or multiple add-in cards may be connected to interconnect system 402, or one or more of PPUs 502 may be integrated into a bridge chip. PPUs 502 in a multi-PPU system may be identical to or different from one another. For example, different PPUs 502 might have different numbers of processing cores and/or different amounts of PP memory 504. In implementations where multiple PPUs 502 are present, those PPUs may be operated in parallel to process data at a higher throughput than is possible with a single PPU 502. Systems incorporating one or more PPUs 502 may be implemented in a variety of configurations and form factors, including, without limitation, desktops, laptops, handheld personal computers or other handheld devices, servers, workstations, game consoles, embedded systems, and the like.

Figure 6:
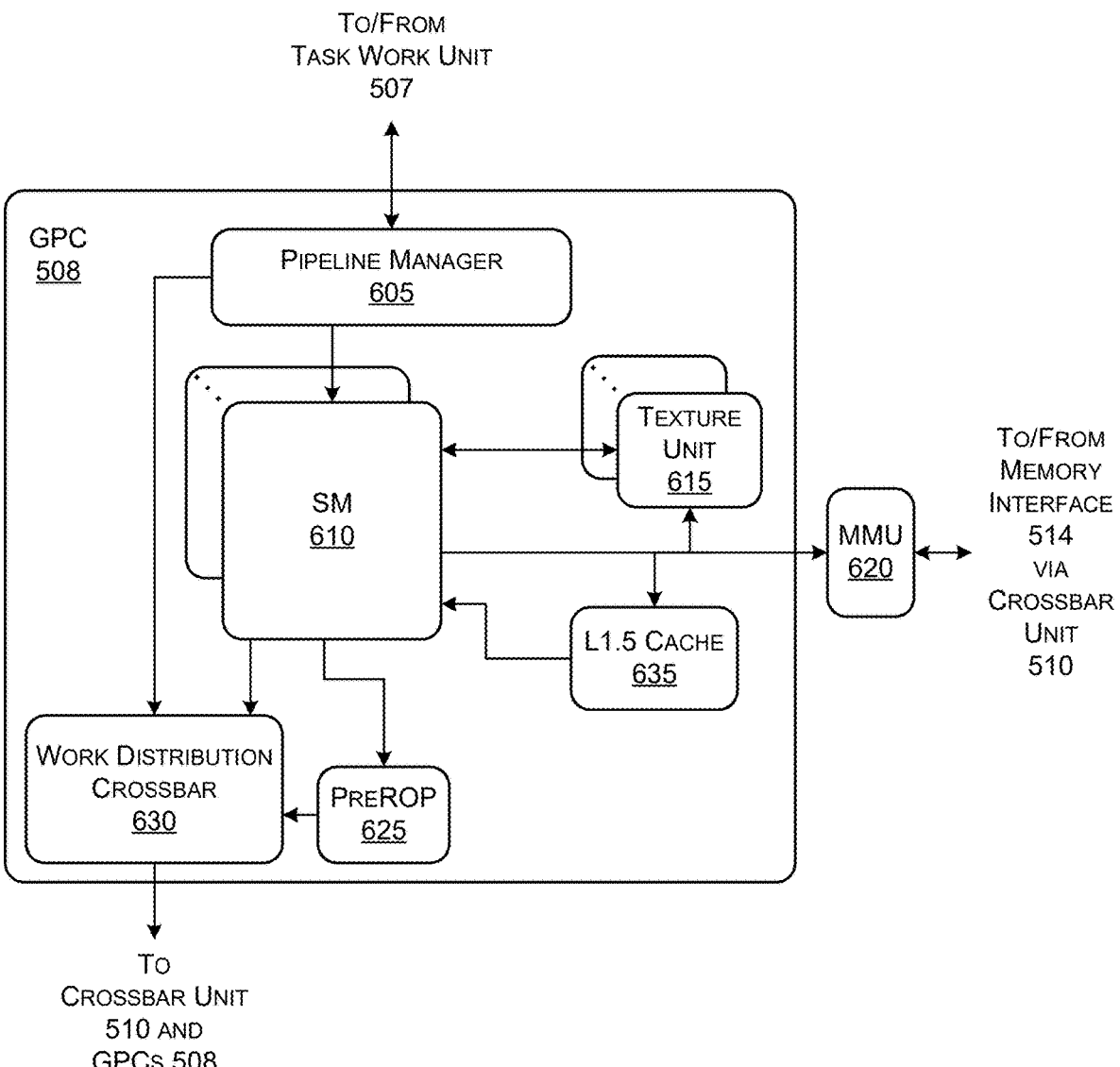
FIG. 6 is a block diagram of a general processing cluster (GPC) included in the parallel processing unit (PPU) of FIG. 5, according to various embodiments of the present disclosure.

FIG. 6 is a block diagram of a general processing cluster (GPC) 508 included in the parallel processing unit (PPU) 502 of FIG. 5, according to various embodiments. In operation, GPC 508 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 508. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 508 is controlled via a pipeline manager 605 that distributes processing tasks received from a work distribution unit (not shown) within task/work unit 507 to one or more streaming multiprocessors (SMs) 610. Pipeline manager 605 may also be configured to control a work distribution crossbar 630 by specifying destinations for processed data output by SMs 610.

In one embodiment, GPC 508 includes a set of M of SMs 610, where M≥ 1. Also, each SM 610 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 610 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 610 is configured to process one or more thread groups. As used herein, a "thread group" or "warp" refers to a group of threads concurrently executing the same program on different input data, with one thread of the group being assigned to a different execution unit within an SM 610. A thread group may include fewer threads than the number of execution units within the SM 610, in which case some of the execution may be idle during cycles when that thread group is being processed. A thread group may also include more threads than the number of execution units within the SM 610, in which case processing may occur over consecutive clock cycles. Since each SM 610 can support up to G thread groups concurrently, it follows that up to G*M thread groups can be executing in GPC 508 at any given time.

Additionally, a plurality of related thread groups may be active (in different phases of execution) at the same time within an SM 610. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 610, and m is the number of thread groups simultaneously active within the SM 610. In various embodiments, a software application written in the compute unified device architecture (CUDA) programming language describes the behavior and operation of threads executing on GPC 508, including any of the above-described behaviors and operations. A given processing task may be specified in a CUDA program such that the SM 610 may be configured to perform and/or manage general-purpose compute operations.

Although not shown in FIG. 6, each SM 610 contains a level one (L1) cache or uses space in a corresponding L1 cache outside of the SM 610 to support, among other things, load and store operations performed by the execution units. Each SM 610 also has access to level two (L2) caches (not shown) that are shared among all GPCs 508 in PPU 502. The L2 caches may be used to transfer data between threads. Finally, SMs 610 also have access to off-chip "global" memory, which may include PP memory 504 and/or memory 404. It is to be understood that any memory external to PPU 502 may be used as global memory. Additionally, as shown in FIG. 6, a level one-point-five (L1.5) cache 635 may be included within GPC 508 and configured to receive and hold data requested from memory via memory interface 514 by SM 610. Such data may include, without limitation, instructions, uniform data, and constant data. In embodiments having multiple SMs 610 within GPC 508, the SMs 610 may beneficially share common instructions and data cached in L1.5 cache 635.

Each GPC 508 may have an associated memory management unit (MMU) 620 that is configured to map virtual addresses into physical addresses. In various embodiments, MMU 620 may reside either within GPC 508 or within the memory interface 514. The MMU 620 includes a set of page table entries (PTEs) used to map a virtual address to a physical address of a tile or memory page and optionally a cache line index. The MMU 620 may include address translation lookaside buffers (TLB) or caches that may reside within SMs 610, within one or more L1 caches, or within GPC 508.

In graphics and compute applications, GPC 508 may be configured such that each SM 610 is coupled to a texture unit 615 for performing texture mapping operations, such as determining texture sample positions, reading texture data, and filtering texture data.

In operation, each SM 610 transmits a processed task to work distribution crossbar 630 in order to provide the processed task to another GPC 508 for further processing or to store the processed task in an L2 cache (not shown), parallel processing memory 504, or memory 404 via crossbar unit 510. In addition, a pre-raster operations (preROP) unit 625 is configured to receive data from SM 610, direct data to one or more raster operations (ROP) units within partition units 515, perform optimizations for color blending, organize pixel color data, and perform address translations.

It will be appreciated that the core architecture described herein is illustrative and that variations and modifications are possible. Among other things, any number of processing units, such as SMs 610, texture units 615, or preROP units 625, may be included within GPC 508. Further, as described above in conjunction with FIG. 5, PPU 502 may include any number of GPCs 508 that are configured to be functionally similar to one another so that execution behavior does not depend on which GPC 508 receives a particular processing task. Further, each GPC 508 operates independently of the other GPCs 508 in PPU 502 to execute tasks for one or more application programs. In view of the foregoing, persons of ordinary skill in the art will appreciate that the architecture described in FIGS. 1-7 in no way limits the scope of the various embodiments of the present disclosure.

Please note, as used herein, references to shared memory may include any one or more technically feasible memories, including, without limitation, a local memory shared by one or more SMs 610, or a memory accessible via the memory interface 514, such as a cache memory, parallel processing memory 504, or memory 404. Please also note, as used herein, references to cache memory may include any one or more technically feasible memories, including, without limitation, an L1 cache, an L1.5 cache, and the L2 caches.

Example Data Center

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory, or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software, or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 400 of FIG. 4—e.g., each device may include similar components, features, and/or functionality of the computing device(s) 400. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 400 described herein with respect to FIG. 4. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

In sum, various embodiments include techniques for routing generic HTTP traffic over a reversed UDP stream in a networked computer system. The disclosed techniques provide a reverse proxy server where client-server connections originate from the GPU servers out to the client. The reverse proxy server is publicly addressable by the client, while the GPU servers are not publicly addressable by the client.

A client establishes a connection to the reverse proxy server as if the reverse proxy server is the GPU server. This connection can be a transport control protocol/internet protocol (TCP/IP) connection that supports hypertext transfer protocol (HTTP) traffic. A sidecar application associated with the GPU server establishes a uniform data protocol (UDP) connection with the reverse proxy server in a manner that is transparent to the GPU server and the client device. Once the sidecar application on the GPU server establishes the connection with the reverse proxy server, the reverse proxy server utilizes the connection in a manner that is semantically reversed from the traditional request/response communication model. When the reverse proxy server receives a request from a client, the reverse proxy server notifies the GPU server via a queue that a client is waiting for a response. The GPU server connects to the client using high speed communications path to establish a socket-like stream, such as a QUIC stream, from the GPU server out to the reverse proxy server. From there, the reverse proxy server routes traffic between the client and the GPU server over this stream. The incoming QUIC connection is "reversed" in that the data flowing across the stream behaves as if the client initiated the connection rather than the GPU server. With this approach, the reverse proxy server establishes a high-speed connection between the client and the GPU server as if the GPU server was publicly addressable by the client.

At least one technical advantage of the disclosed techniques relative to the prior art is that these techniques result in a high-speed connection between clients and servers in a networked computer system without requiring servers to be publicly accessible, thereby, exposing servers to security risks. Another technical advantage of the disclosed techniques is that client applications and associated protocol buffers do not need to be modified to take advantage of the disclosed techniques, thereby easing implementation of the disclosed techniques.

1. In some embodiments, a processor comprises: one or more circuits to: receive, from a client device via a first connection, a client request to perform a function with a server that is not addressable by the client device; determine that a second connection with the server has been established; receive first data from and transmitting second data to the client device via the first connection; and transmit the first data to and receiving the second data from the server via the second connection.

2. The processor according to clause 1, wherein the processor is comprised in at least one of: a control system for an autonomous or semi-autonomous machine; a perception system for an autonomous or semi-autonomous machine; a system for performing simulation operations; a system for performing digital twin operations; system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

3. The processor according to clause 1 or clause 2, wherein the first connection comprises a transport control protocol/internet protocol (TCP/IP) connection that supports hypertext transfer protocol (HTTP) traffic.

4. The processor according to any of clauses 1 to 3, wherein the second connection comprises a uniform data protocol (UDP) connection.

5. The processor according to any of clauses 1 to 4, wherein the client request includes a header that comprises a function identifier that identifies a function to be perform by the server.

6. The processor according to any of clauses 1 to 5, wherein the client request specifies input data for the function.

7. The processor according to any of clauses 1 to 6, wherein the one or more circuits further transmit a function invocation message associated with the function to an application programming interface (API).

8. The processor according to any of clauses 1 to 7, wherein the API pushes a stateful work request associated with the function invocation message onto a message queue.

9. The processor according to any of clauses 1 to 8, wherein the stateful work request comprises a uniform resource location (URL) of a proxy instance associated with the client request.

10. The processor according to any of clauses 1 to 9, wherein the one or more circuits further, subsequent to the API pushing the stateful work request onto the message queue, receive an API response from the API comprising a request identifier of the function invocation message and an authentication key.

11. The processor according to any of clauses 1 to 10, wherein the one or more circuits further wait for a connect request from the server that includes the request identifier of the function invocation message and the authentication key.

12. The processor according to any of clauses 1 to 11, wherein the one or more circuits further receive the connect request from the server prior to determining that the second connection has been established with the server.

13. The processor according to any of clauses 1 to 12, wherein the connect request comprises a second request identifier and a second authentication key, and wherein the one or more circuits further determine that the second request identifier and the second authentication key matches the request identifier and the authentication key received via the API response.

14. The processor according to any of clauses 1 to 13, wherein the server polls the message queue until the server detects the function invocation message; and wherein the one or more circuits further receive a connect request from the server.

15. The processor according to any of clauses 1 to 14, wherein a sidecar application associated with the server establishes the second connection in a manner that is transparent to the server and the client device.

16. In some embodiments, a system comprises: one or more processing units; and one or more memory units storing instructions that, when executed by the one or more processing units, cause the one or more processing units to execute operations comprising: receiving, from a client device via a first communication link, a client request to perform a function with a server that is not addressable by the client device; determining that a second communication link with the server has been established; receiving first data from and transmitting second data to the client device via the first communication link; and transmitting the first data to and receiving the second data from the server via the second communication link.

17. The system according to clause 16, wherein the system is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

18. The system according to clause 16 or clause 17, wherein the first communication link and the second communication link have different network connection types.

19. In some embodiments, a method comprises: receiving, from a client device via a first connection of a first type, a client request to perform a function with a server that is not addressable by the client device; establishing a second connection of a second type with the server; and bridging the first connection and the second connection to facilitate transmission of traffic between the client device and the server.

20. The method according to clause 19, wherein first type is different from the second type.

Any and all combinations of any of the claim elements recited in any of the claims and/or any elements described in this application, in any fashion, fall within the contemplated scope of the present disclosure and protection.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

While the preceding is directed to embodiments of the present disclosure, other and further embodiments of the disclosure may be devised without departing from the basic scope thereof, and the scope thereof is determined by the claims that follow.

What is claimed is:

1. A processor comprising:
one or more circuits to:
  receive, from a client device via a first connection, a client request to perform a function with a server that is not addressable by the client device;
  receive a connection request to establish a second connection in response to a stateful work request being retrieved from a message queue and the stateful work request being transmitted to the server;
  determine that the second connection with the server has been established;
  receive first data from and transmitting second data to the client device via the first connection; and
  transmit the first data to and receiving the second data from the server via the second connection.

2. The processor of claim 1, wherein the processor is comprised in at least one of:
  a control system for an autonomous or semi-autonomous machine;
  a perception system for an autonomous or semi-autonomous machine;
  a system for performing simulation operations;
  a system for performing digital twin operations;
  a system for performing light transport simulation;

a system for performing collaborative content creation for 3D assets;
  a system for performing deep learning operations;
  a system implemented using an edge device;
  a system for generating or presenting at least one of virtual reality content, augmented reality content, or mixed reality content;
  a system implemented using a robot;
  a system for performing conversational AI operations;
  a system for generating synthetic data;
  a system incorporating one or more virtual machines (VMs);
  a system implemented at least partially in a data center; or
  a system implemented at least partially using cloud computing resources.

3. The processor of claim 1, wherein the first connection comprises a transport control protocol/internet protocol (TCP/IP) connection that supports hypertext transfer protocol (HTTP) traffic.

4. The processor of claim 1, wherein the second connection comprises a uniform data protocol (UDP) connection.

5. The processor of claim 1, wherein the client request includes a header that comprises a function identifier that identifies a function to be performed by the server.

6. The processor of claim 1, wherein the client request specifies input data for the function.

7. The processor of claim 1, wherein the one or more circuits further transmit a function invocation message associated with the function to an application programming interface (API).

8. The processor of claim 7, wherein the API pushes a stateful work request associated with the function invocation message onto a message queue.

9. The processor of claim 8, wherein the stateful work request comprises a uniform resource location (URL) of a proxy instance associated with the client request.

10. The processor of claim 8, wherein the one or more circuits further, subsequent to the API pushing the stateful work request onto the message queue, receive an API response from the API comprising a request identifier of the function invocation message and an authentication key.

11. The processor of claim 10, wherein the one or more circuits further wait for a connect request from the server that includes the request identifier of the function invocation message and the authentication key.

12. The processor of claim 11, wherein the one or more circuits further receive the connect request from the server prior to determining that the second connection has been established with the server.

13. The processor of claim 11, wherein the connect request comprises a second request identifier and a second authentication key, and wherein the one or more circuits further determine that the second request identifier and the second authentication key matches the request identifier and the authentication key received via the API response.

14. The processor of claim 8, wherein the server polls the message queue until the server detects the function invocation message; and wherein the one or more circuits further receive a connect request from the server.

15. The processor of claim 1, wherein a sidecar application associated with the server establishes the second connection in a manner that is transparent to the server and the client device.

16. A system comprising:

one or more processing units; and one or more memory units storing instructions that, when executed by the one or more processing units, cause the one or more processing units to execute operations comprising:

receiving, from a client device via a first communication link, a client request to perform a function with a server that is not addressable by the client device;

receiving a connection request to establish a second communication link in response to a stateful work request being retrieved from a message queue and the stateful work request being transmitted to the server;

determining that the second communication link with the server has been established;

receiving first data from and transmitting second data to the client device via the first communication link; and transmitting the first data to and receiving the second data from the server via the second communication link.

17. The system of claim 16, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

18. The system of claim 16, wherein the first communication link and the second communication link have different network connection types.

19. A method comprising:

receiving, from a client device via a first connection of a first type, a client request to perform a function with a server that is not addressable by the client device;

receiving a connection request to establish a second connection in response to a stateful work request being retrieved from a message queue and the stateful work request being transmitted to the server;

establishing the second connection of a second type with the server; and bridging the first connection and the second connection to facilitate transmission of traffic between the client device and the server.

20. The method of claim 19, wherein the first type is different from the second type.

* * * * *